(12) United States Patent
Lord

(10) Patent No.: US 6,451,277 B1
(45) Date of Patent: Sep. 17, 2002

(54) METHOD OF IMPROVING THE EFFICIENCY OF A SILICON PURIFICATION PROCESS

(76) Inventor: Stephen M Lord, 109 Peppertree La., Encinitas, CA (US) 92024

( * ) Notice: Subject to any disclaimer, the term of this patent is extended or adjusted under 35 U.S.C. 154(b) by 0 days.

(21) Appl. No.: 09/589,563

(22) Filed: Jun. 6, 2000

(51) Int. Cl.[7] .............................................. C01B 33/02

(52) U.S. Cl. ...................... 423/349; 423/342

(58) Field of Search ................ 423/350, 344, 423/348, 342

(56) References Cited

U.S. PATENT DOCUMENTS

| | | |
|---|---|---|
| 3,012,861 A | 12/1961 | Ling |
| 4,084,024 A * | 4/1978 | Schumacher ............... 427/215 |
| 4,207,360 A | 6/1980 | Padovani |
| 4,213,937 A * | 7/1980 | Padovani et al. ........... 422/142 |
| 4,416,913 A | 11/1983 | Ingle |
| 4,784,840 A | 11/1988 | Gautreaux |
| 4,818,495 A | 4/1989 | Iya |
| 4,900,411 A | 2/1990 | Poong |
| 4,992,245 A | 2/1991 | Van Slooten |
| 5,037,503 A | 8/1991 | Kajimoto |
| 5,242,671 A | 9/1993 | Allen |
| 5,374,413 A | 12/1994 | Kim |
| 5,798,137 A | 8/1998 | Lord |
| 5,810,834 A | 9/1998 | Lord |

OTHER PUBLICATIONS

A. M. Beers CVD Silicon Structures Formed by Amorphous and Crystalline Growth Journal of Crystal Growth vol. 64, 1983, pp. 563–571.

* cited by examiner

Primary Examiner—Stanley S. Silverman
Assistant Examiner—Edward M. Johnson

(57) ABSTRACT

Methods for Heating a Fluidized Bed Silicon Deposition Apparatus with the steps of: one or more heaters and entries to the reactor for the gas or gases which can be heated without decomposition separate from one or more heaters and entries for the gas or gases which decompose to form silicon when heated, heating the gas or gases which do not decompose to temperatures between 400–2000 C., more preferably 800–1600 C., heating the gases which do decompose thermally to temperatures less than the temperature at which they decompose, typically 25–400 C., preferably 300–350 C., and alternatively or in combination with the above steps also providing a means for removal of the silicon beads, heating the beads to a temperature between 800–1200 C. and preferably to a temperature between 900–1100 C. and returning the beads to the reactor. Providing localized cooling of the entries for the thermally decomposable gases. These two heating methods either alone or in combination can provide all the heat needed to operate the reactor in the desired operating range of 800–1100 C. and can provide the heat at the inlet of the reactor where the cold silicon containing gases need to be raised to the operating temperature of the reactor. Heating the non decomposing gases and the silicon beads outside the reactor can be accomplished easily with a variety of low cost heating techniques. Other benefits include, higher flow rates in the reactor, higher production rates, larger and more spherical beads, increased deposition efficiency and reduced risk of sintering and plugging.

10 Claims, 5 Drawing Sheets

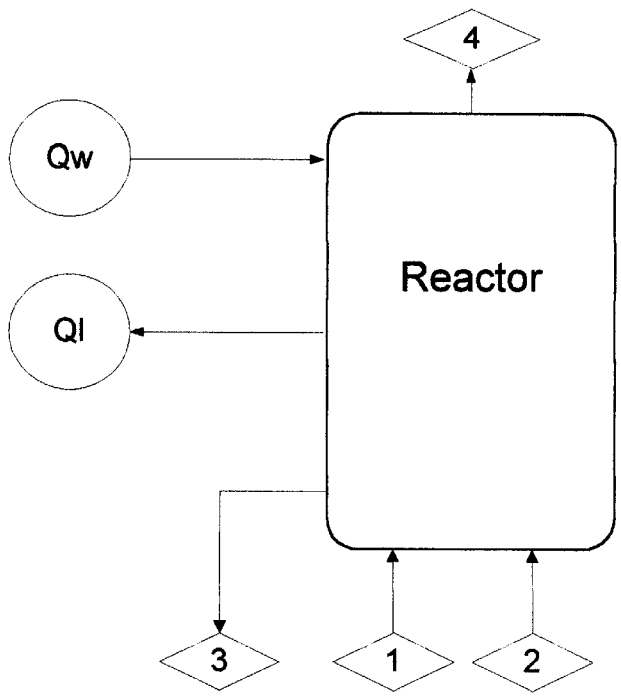

Fig. 1a
Fluid Bed Reactor with Two Inlet Streams

Mass Balance

M1 + M2 = M3 + M4

Enthalpy Balance

Each Stream has a Mass flow M and a Specific Enthalpy H at Temperature T.
The reactor has heat input Qw and Heat Loss Ql Qw = Ql + M4H4 + M3H3 − M1H1 − M2H2

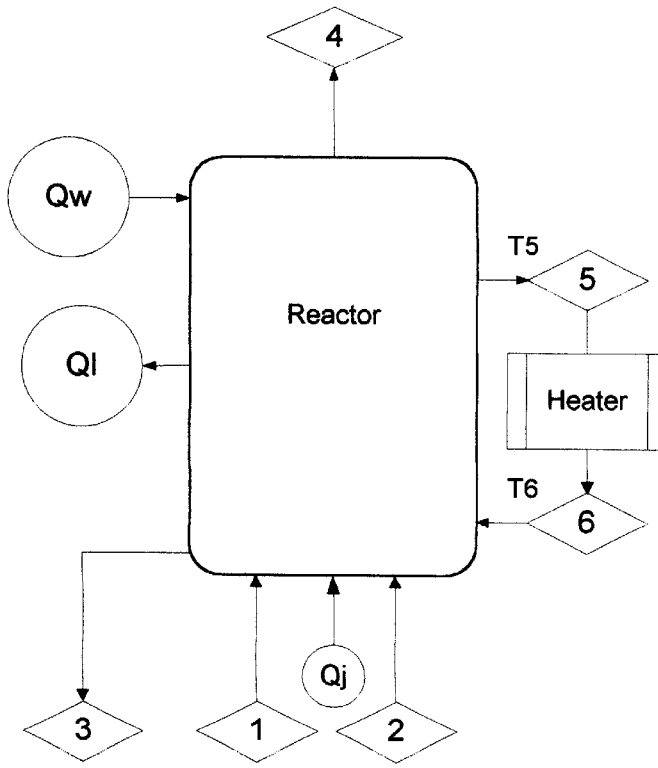

Fig. 1b
Fluid Bed Reactor with Two Inlet Streams, A Recycle Heater and A Jet heater Mass Balance

M1 + M2 + M6 = M3 + M4 + M5

Enthalpy Balance

Each Stream has a Mass flow M and a Specific Enthalpy H at Temperature T.
The reactor has heat input Qw and Qj and Heat Loss Ql Qw = Ql + M4H4 + M3H3 + M5H5 − M1H1 − M2H2 − M6H6 − Qj Silane Fluid Bed Reactor
with
A Gas Recycle Ejector and
Pulse Bead and Gas Heater
and 4 Silane Inlet Coolers
(two of four shown)

TCS Fluid Bed Reactor
with
Hydrogen Recovery and
Pulse Bead and Gas
Heater
and 4 TCS Inlet Coolers
(two of four shown)

METHOD OF IMPROVING THE EFFICIENCY OF A SILICON PURIFICATION PROCESS

RELATED APPLICATION application Ser. No. 09/507,154

Filing Date: Feb. 18, 2000

GRP Art Unit: 1'754

Inventor: Stephen M. Lord

Title: Method for Improving the Efficiency of A Silicon Purification Process

BACKGROUND OF THE INVENTION

This invention relates generally to the field of deposition of silicon by chemical vapor deposition, and more particularly to methods for Heating a Fluidized Bed Silicon Deposition Apparatus which are more convenient, more efficient, of lower cost and provide better quality silicon beads than existing methods High purity polycrystalline silicon is the basic raw material of the semiconductor and photovoltaic industries. It is currently produced by the decomposition of highly purified silicon containing gases onto a heated high purity silicon surface. This process is termed chemical vapor deposition. The standard industry technique uses high purity silicon rods as the heated surface. An alternative fluidized bed technology is also used on a limited scale. This latter technology provides a large surface area of heated silicon on the surface of beads fluidized by the silicon bearing gas and other diluents and offers the promise of reduced capital and operating costs and production of a more convenient form of silicon in the shape of beads. Many attempts have been made to implement the fluidized bed technology but all have suffered from severe operational and purity problems, which have prevented full commercialization.

The major use for the polycrystalline silicon is in production of single crystal silicon via melting and growth of single crystal silicon boules in Czochralski crystal pullers. Such pullers have specific requirements with regard to feeding the beads, contamination, ease of melting etc. which must be met in order to use silicon beads. Kajimoto et al documents some of these issues in U.S. Pat. No. 5,037,503.

The major operational problem is sintering of the beads in the reactor and the resultant plugging of the reactor, the major purity problems are metals, carbon, oxygen and hydrogen in the bulk and surface of the product and the major problem in feeding beads to the crystal puller is difficulty in controlling the bead flow due to variation in shape and size.

The sintering appears to be more prevalent as the temperature, deposition rate, silicon containing gas concentration and bead size increases and less prevalent as the fluidizing gas flow rate increases. Hence a violently fluidized bed will have a lower tendency to sinter but may tend to blow over more dust and will require more heat.

It has been accepted that it is important to have a reactor that does not contaminate the product and that the use of metal reactors is not feasible, see Ling U.S. Pat. No. 3,012,861 and Ingle U.S. Pat. No. 4,416,913 and hence metal contamination can be resolved by not contacting the beads with any metal parts.

Similarly contact with carbon or carbon containing materials leads to carbon contamination so graphite or silicon carbide parts are usually coated with silicon. Oxygen normally comes in through oxygen containing compounds such as water, carbon monoxide and carbon dioxide in the inlet gases and hence all such compounds are removed from the gas streams to as great a degree as is practicable. Oxygen containing materials such as silicon oxide (quartz) are frequently used as containment materials, see Ingle above, and can be used in contact with silicon although care must be taken to prevent erosion.

Hydrogen contamination is primarily caused during the deposition process when hydrogen remains trapped in the bead. This is a time, temperature and deposition rate dependent process which has been described by A. M. Beers et al "CVD Silicon Structures Formed by Amorphous and Crystalline Growth," Journal of Crystal Growth, 64. (1983) 563–571. For rapid deposition rates of the order of 2–3 8 micron/minute which are desired in commercial reactors the silicon surface temperature must exceed 800 C. Typical rod reactors usually operate above this temperature as do halosilane based fluid bed reactors and thus such reactors do not suffer from this problem. The current silane based commercial fluid bed reactors operate below this temperature in at least part of the reactor and consequently have dusting problems see Gautreaux and Allen U.S. Pat. No. 4,784,840 and require a second dehydrogenation step as described by Allen in U.S. Pat. No. 5,242,671.

The problem of size and shape is not as important but most polycrystalline consumers would prefer large round beads because they flow better and have less surface area, thus less risk of contamination. Large beads require more gas flow to fluidize and hence more heat to bring said gas up to operating temperature.

One standard way to heat a fluidized bed is through the walls because the heat transfer from the wall to the particles is very good and wall heaters can be easily and cheaply built using electric heating coils. Another standard way is to preheat the gas reactants. A further standard approach is to recover heat from both the solid and gaseous effluent of the reactor by means of heat exchange. A yet further standard approach is to recycle unused reactant and or carrier gas. In a silicon deposition reactor there are problems facing all of these approaches. If the wall is heated then it is by definition hotter than the bed particles and hence more likely to be deposited on as the reaction rate is strongly influenced by temperature. The rule of thumb is that reaction rate doubles with each 10 degree Celsius rise in temperature. Hence a hot wall causes wall deposits which are a loss of product, increase the resistance to heat transfer through the wall and can cause breakage of the reactor on cool-down due to differential thermal expansion. There is also the problem that the heat load is localized to the inlet area where the incoming gases are heated up to reaction temperature. Thus hot beads may be present in the reactor but unable to circulate down to the inlet zone fast enough to provide sufficient heat. Heating the gas reactants is restricted by the thermal decomposition of the silicon bearing gases at around 350–400 C. Thus the gases cannot be heated above this temperature without depositing in the heater or in the inlet to the reactor. This problem is further compounded by heat conducted back into the inlet from hot beads located just above the inlet of the silicon bearing gases. The surface temperature of these beads should be over 800 C. to prevent hydrogen contamination, hence there is a high temperature gradient between the beads at 800 C. and the inlet which needs to be below the thermal decomposition temperature of the silicon containing gases which is 350–400 C. Recovery of heat is difficult because of the tendency of the silicon containing gas to form wall deposits which in turn means the wall temperature must be below 350 C. which is difficult when cooling gases or solids which are at 800 C. or greater. Recycle of unused reactants or carrier gas is also difficult for the same decomposition reason. The recycle gas must be cooled to below the thermal decomposition temperature of the silicon containing gases before mixing with them.

Thus the prior technology has attempted to deal with the heating issue in a variety of ways. Ingle, U.S. Pat. No. 4,416,913 noted the use of microwaves to heat the silicon beads directly through the quartz wall which itself is not heated by microwaves. Poong et al. in U.S. Pat. No. 4,900,411 advises using microwaves and notes the need to cool the wall and the distributor grid in order to prevent silicon deposits, which can then absorb the microwaves. Iya in U.S. Pat. No. 4,818,495 also suggests cooling the distributor grid and providing a heating zone above the reacting zone to compensate. Kim et al in U.S. Pat. No. 5,374,413 notes that cooling of the wall is not effective in preventing wall deposits and greatly increases power consumption and suggests a partition between the reacting and heating zone. Partitions have also been suggested by Ingle see above and Van Slooten in U.S. Pat. No. 4,992,245. Neither Iya in U.S. Pat. No. 4,818,495 nor Van Slooten in U.S. Pat. No. 4,992,245 provided means for the heated beads to travel down to the reacting area in sufficient quantity to heat the incoming gases and offset the distributor cooling. Lord in U.S. Pat. No. 5,798,137 suggests use of "jet heating" where lasers are used to heat through the inlet jet itself or chlorine is added to react with silane in the jet region. Lord in U.S. Pat. No. 5,810,934, also suggests using an isolation tube between the inner tube containing the silicon containing gases and the outer tube containing the hot beads in order to control the wall temperature of the inner tube below the decomposition temperature. This suffers from the two disadvantages of reducing the heat transfer and the heat transfer rate. Hence only a portion of the available heat can be recovered thus requiring additional bead cooling and the surface area must be larger than would be required other wise. Lord in fact recognizes this and provides an alternate approach using a water cooled bead cooler.

All the prior technology makes provision for dilution of the silicon bearing gas before the mixture is fed to the reactor stream and so the inlet gas temperature is still limited by the decomposition temperature of the silicon bearing gas which is typically around 350 C. Kim and Van Slooten also make provision for a separate entry for a carrier gas into the heating zone which is separated from the reaction zone by a partition and they claim this gas may be heated up to the reaction temperature although in their examples the actual temperature, is below that. In Van Slooten's example the inlet gas is 500 C. compared to reactor temperatures of 650 C. at the top and 550 C. and a heating zone temperature of 660 C. In Kim's examples the carrier gas preheat temperature was 250 C. and 350 C.

The prior technology had difficulty in reaching the required high temperatures, greater than 800 C., without contaminating the product or plugging the reactor. These high temperatures are needed, particularly at the gas inlet, for production of hydrogen and dust free product. A critical deficiency of the prior technology, with the exception of Lord in U.S. Pat. Nos. 5,798,137 and 5,810,934, is the failure to recognize the importance of the need to maintain high temperatures according to the experimental data and theoretical relationships in the article of A. M. Beers et al "CVD Silicon Structures Formed by Amorphous and Crystalline Growth," Journal of Crystal Growth, 64. (1983) 563–571. This article details the relationship of temperature, time and deposition rate with higher deposition rates requiring higher temperatures and times in order to crystallize the deposited amorphous silicon and release the codeposited hydrogen.

In the prior technology the inlet area has the most serious problems in product quality because of a combination of factors all of which tend to prevent the needed crystallization to produce polycrystalline silicon and remove hydrogen and/or other codeposited elements such as halogens. This area has the highest silicon bearing gas concentrations, the lowest temperatures and the least post deposit time for the beads. The deposit rates tend to be highest at the inlet because of the high silicon containing gas concentrations and the rapid decomposition of the silicon bearing gases once the temperature is above 500 C. The temperatures are lower because the incoming gases are cold and cool the beads near the inlet as the gases warm up. Finally the beads are removed at or near the bottom of the reactor which is also the inlet for the gases thus the beads removed have just been deposited on and hence have little time to crystallize the recent deposits and dehydrogenate. Of these factors the most important one is the temperature because the crystallization is strongly dependent on temperature. Frequently the prior technology aggravates this problem by cooling the distributor grid. Thus in the prior technology most of the reaction and deposition occurs near the inlet and much of this deposit is unsuitable because of its powdery nature and high hydrogen content. Iya in U.S. Pat. No. 4,818,495 shows a temperature profile where the zone just above the grid is at 500 C. and the top of the bed is at 770 C. Hence the product would be very dusty and contaminated with hydrogen. Similarly in Van Slooten U.S. Pat. No. 4,992,245 the distributor surface is cooled to a temperature between 200–400 C. and he states in his example that the temperature at the top of the fluidized bed is 923 K (700 C.) and at the bottom is 823 K (600 C.). Again the product would be dusty and contaminated with hydrogen. Kim has the reactive gas distributor cooled to 318 C. in his example 2 and has a CVD reaction temperature of 930 C. Since the partition isolates the reaction zone from the heating zone and is half the bed height the beads next to the reactive gas inlet are much colder than the upper part of the reactor as the hot beads from the heater section do not mix with them. These beads are primarily heated through the quartz partition which itself is deposited on by the silicon containing gases in the reaction zone. This silicon wall deposit will be hotter than the beads in the reaction zone and will thus grow at a more rapid rate.

This problem of wall deposit on the partition is also faced by the reactor described in the Van Slooten U.S. Pat. No. 4,992,245. It is apparent that the provision of a partition does not avoid the problem of wall deposits it merely relocates them to the partition. Thus the requirement for a partition is an additional deficiency in the prior technology.

The provision of a partition can help the bead quality if the beads are removed from the heating zone of the partitioned reactor since the beads have more time at a higher temperature without any deposition. Unfortunately such post deposition crystallization and dehydrogenation suffers from the problem that the hydrogen must diffuse out through the complete deposit thickness and this can take several hours or days as shown by Allen in U.S. Pat. 5,242,671.

This amount of time is usually not available as a practical matter since it requires a significantly larger reactor and also higher temperatures (1000–1100 C.).

Lord in U.S. Pat. No. 5,798,137 recognizes the need to remove hydrogen as the deposition occurs in order to minimize the distance the hydrogen has to diffuse out and provides localized "jet heating" at the inlet with lasers and or chlorine. The major deficiencies of this approach are that laser heating is expensive and inefficient and the equipment is high maintenance and chlorine heating is expensive, reduces yield and contributes contaminants.

The provision of a partition requires a carrier gas to fluidize the beads on the heating side of the partition. Since this is not a reactive gas it can be heated above the decomposition temperature of the silicon bearing gas and both Kim and Van Slooten claim this feature in their patents. However the sensible heat of the carrier gas is not used to directly heat the reacting beads and neither Van Slooten nor Kim claim the possibility of heating the carrier gas above the reaction temperature. In the example by Kim the carrier gas is 4.0 mole/min of hydrogen at 250 C. and the reactive gas is 3.1 mole/min of trichlorosilane and 6.0 mol/min of hydrogen at 100 C. Neither temperature is above the decomposition temperature of TCS (350 C.) or remotely close to the stated CVD reaction temperature of 930 C. In fact more hydrogen is used as a diluent in the reactive gas than is used as "heated" carrier gas.

The CVD reaction temperature of 930 C. is low for trichlorosilane deposition by the hydrogen reduction reaction and will result in lower yield of silicon as is shown in example 1 where the TCS feed is 0.35 mol/min and the silicon deposition rate is 1104 grams over ten hours which calculates to 1.85 grams/min or 0.066 mol/min. This is a yield of 18.8% of the silicon in the TCS. The preferred temperature for hydrogen reduction is above 1000 C. and preferably 1100–1250 C. as noted in Padovani U.S. Pat. No. 4,207,360. Obtaining such temperatures required use of high temperature materials such as silicon carbide coated graphite walls which could operate significantly hotter than the beads. Unfortunately this approach causes carbon contamination of the silicon making it unusable. The source of the contamination is primarily a reversible gas phase reaction;

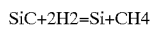

Silicon Carbide+Hydrogen=Silicon+Methane The methane gas is formed at the silicon carbide walls and mixes in with the silicon beads where it decomposes to form silicon carbide thus contaminating the beads. At such high temperatures the silicon carbide diffuses rapidly through the silicon wall deposit to continually replenish the surface.

Thus the prior technology suffers from an inability to obtain the desired high temperatures in the inlet region and/or required for high silicon yield without forming severe reactor or partition wall deposits, plugging the inlet or distribution means, resorting to expensive, exotic and unreliable heating means or contaminating the product.

A further deficiency of most of the prior technology is its failure to provide sufficient post deposition time at temperature to complete the crystallization and dehydrogenation of the product needed to produce low dust and hydrogen content silicon beads.

SUMMARY OF THE INVENTION

A primary object of the invention is to provide methods of heating a fluidized bed silicon deposition reactor, which can provide high reactor temperatures through out the reactor and especially near the inlet or inlets of the silicon containing gases without plugging said inlet or inlets Another object of the invention is to provide methods of heating which supplement established methods of heating through the wall or jet.

Another object of the invention is to provide methods of heating which can be used separately or in combination.

A further object of the invention is to provide methods, which will improve the reactor deposition efficiency.

Yet another object of the invention is to provide methods which will improve reactor energy efficiency and operability.

Still yet another object of the invention is to provide methods which will improve product appearance and quality.

Methods for Heating a Fluidized Bed Silicon Deposition Apparatus comprising the steps of one or more entries to the reactor for the solids or gases which can be heated without decomposition separate from one or more entries for the gas or gases which decompose to form silicon when heated, heating the solids or gases which do not decompose to temperatures between 400–2000 C., more preferably 800–1600 C., separately heating the gases which do decompose thermally to temperatures less than the temperature at which they decompose, typically 25–400 C., preferably 300–350 C., and providing means for the solids and gases which do not decompose to be removed from the reactor and for some of their heat content to be recovered and reused in the reactor.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In order to produce high purity silicon it is necessary to form and purify a liquid or gaseous silicon containing material and then decompose that at elevated temperature back to silicon without contaminating it. Typical silicon containing materials for such purposes usually contain hydrogen and/or a halogen such as chlorine, bromine or iodine. Such materials include silane, disilane, dichlorosilane, trichlorosilane, silicon tetrachloride, tribromosilane and silicon tetraiodide. It is most desirable to recover the material in a convenient pellet form and to have a low cost energy efficient conversion process. Many patents have identified fluid beds as the appropriate technology to accomplish these aims. Implementation of the technology has proved difficult and one of the most difficult problems has been providing sufficient heat at the inlet of the reactor. This proposed heating method can be applied to many of the previously patented processes providing that the method is applied correctly with respect to the thermal isolation of the temperature sensitive silicon containing material prior to its entry to the reactor and any specific requirements of the previously patented processes.

Figure 1:
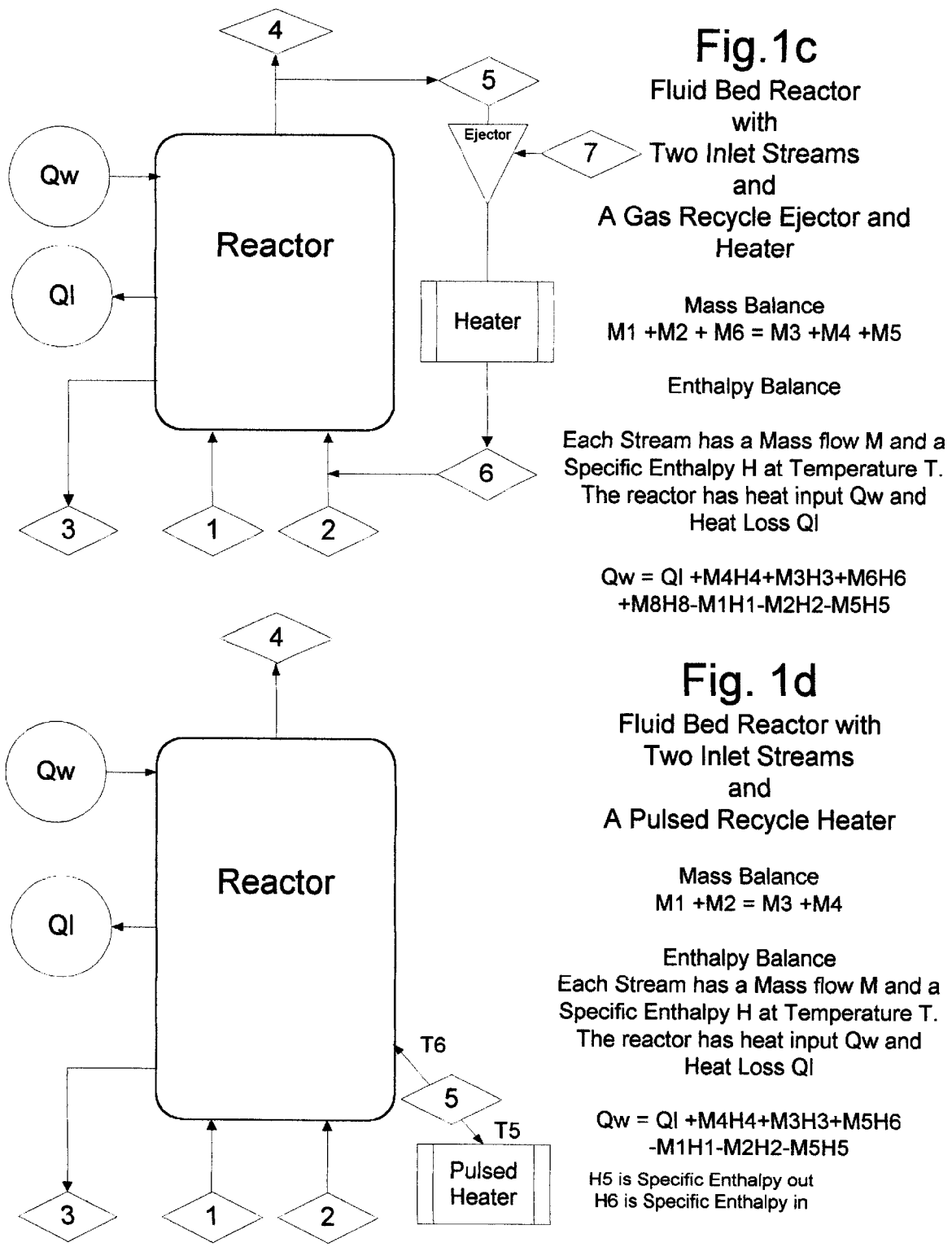
FIGS. 1a through 1d show alternative schematic block flow diagrams and mass and energy balances of a representative group of the many ways in which the various heating methods of the invention may be applied alone or in conjunction with other heating techniques and devices.

Turning first to FIG. 1a there is shown a block flow diagram of a typical fluid bed reactor for silicon deposition. The inlet streams are 1 and 2 each with their own composition, mass, M, temperature, T, and enthalpy, H. Two outlet streams, 2 & 3 are also shown with their respective properties. Heat is provided to the reactor through the wall, Qw, and lost, Ql, from the reactor. The heat loss consists of heat losses through the insulation and heat losses caused by the deliberate cooling provided as part of the thermal isolation of the reactor inlet of stream 1 where the decomposable silicon feedstock enters the reactor. Mass and enthalpy balances are written for the reactor as shown. The outlet mass M3+M4 equals the inlet mass M1+M2. Only M3 is the desired product and it depends on the amount of the decomposable feedstock that is fed to the reactor. The effluent gas M4 contains the gaseous reaction products and any dilution gas. Since dilution gas has to be heated to reaction temperature it seems obvious to eliminate it and run with only decomposable feedstock. However it has been found that this is not normally a is practical solution because the dilution gas helps the operability of the reactor by reducing the risk of plugging and can also take part in the reaction when hydrogen is used together with a halogenated material such as trichlorosilane. Since the specific enthalpy of a stream increases with temperature the hotter the inlet streams the less energy will need to be provided through the wall by Qw. If one or more components of a stream is limited in temperature by decomposition restraints and one or more components are not limited it makes sense to separate the components limited by decomposition from the others. In this example stream 1 is considered the stream which decomposes and stream 2 the stream which does not. Therefore since H3 and H4 are fixed by the reactor temperature and relatively large and H1 is fixed by the decomposition temperature and small it is beneficial to make M1 and M2 as small as feasible given desired production and make H2 as large as possible. Thus the stream, 1, which decomposes should preferably be 100% decomposable material for minimum heat requirements and the stream, 2, should be as small as possible given yield, operational and heat requirements. It is known that the operational requirements of preventing plugging control the silane process since the silicon yield is inherently 100% and that the yield requirements tend to drive the trichlorosilane process since the yield can be increased by higher temperatures and higher hydrogen to trichlorosilane ratios which reduces the size of the trichlorosilane production and purification system. It is desirable in all cases to keep Ql as low as feasible to reduce the amount of heat required.

Turning to FIG. 1b the modifications are shown of providing a jet heater and removing a stream, 5, and heating it from T5 to T6 then returning the stream, 6, to the reactor. The corresponding enthalpy balance is shown and indicates that the required heat to the reactor is reduced by the net heat provided to the recycle stream 6, and by the jet, Qj. This illustrates the feasibility of combining this method with other heating methods.

Turning now to the drawing FIG. 1c an additional stream, 8, is shown to provide the motive power to recycle stream 6 via an ejector device. Such gas is typically at a different temperature than the recycle gas and so must be accounted for in the heater design, however the stream is usually only 5–10% of the volume so does not need its own heater.

In accordance with the present invention, FIG. 1d shows that the recycle of solids can be done using a pulsing technique where hot solids at temperature T6 are pushed up into the entry of the reactor by a pulse of gas from a heater below. At the end of the pulse, colder solids at temperature T5 are drawn down into the heater for heating and recycle upwards during the next pulse. The pulsing of the beads and gas also provides additional agitation of the bed compared to the agitation provide by the equivalent continuous flow. Such agitation is particularly useful for silane based systems which are primarily limited by the related operational problems of agglomeration and plugging. Thus the additional heat provided by pulsing can be used to increase the silane flow M1 and thus increase the silicon production M3.

Figure 2:
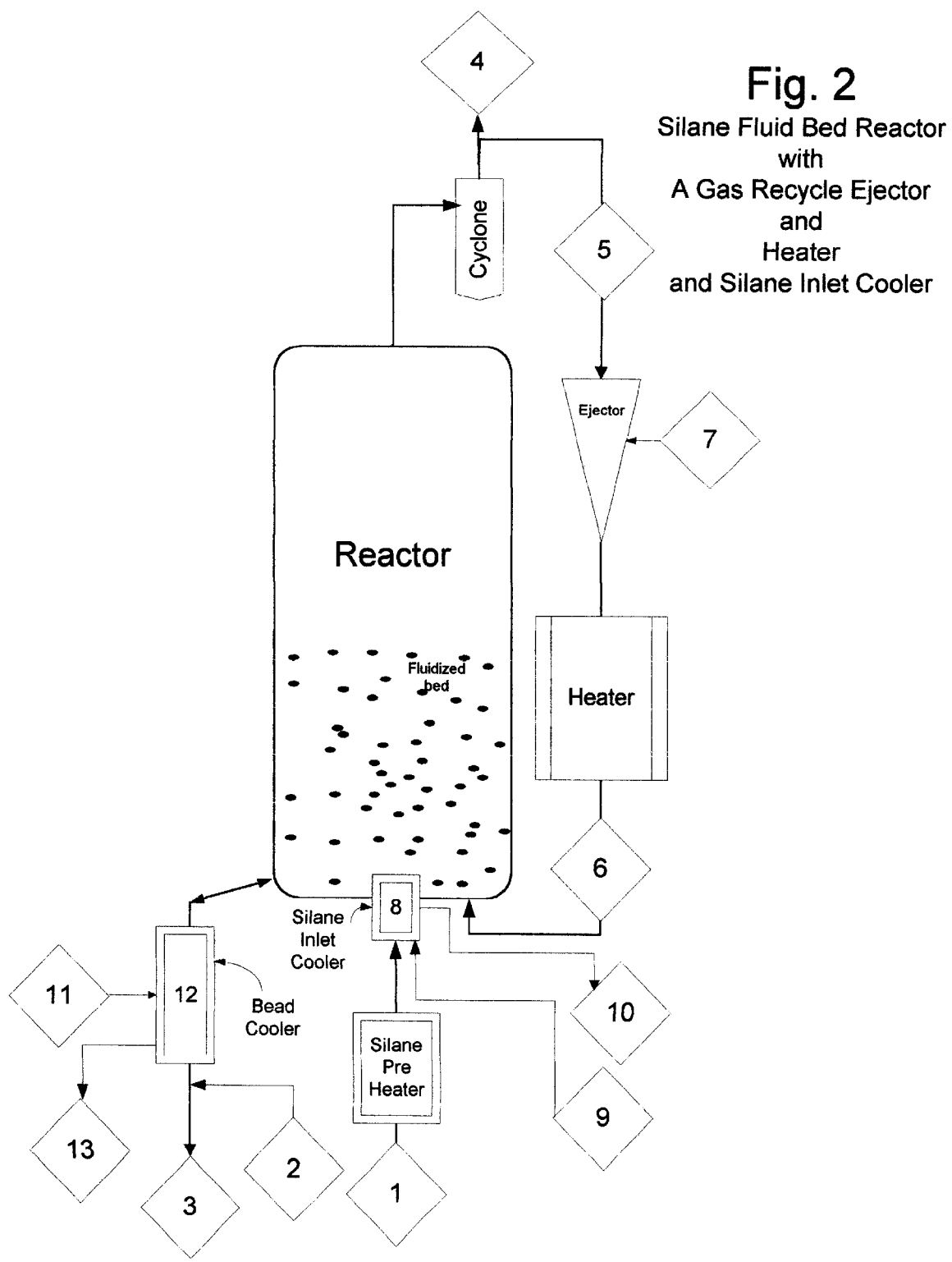
FIG. 2 shows a more detailed schematic and mass and energy balance of a preferred method to heat a silane fluid bed reactor using hot hydrogen gas recycle.

In accordance with an important feature of the present invention, there is shown in FIG. 2 a more detailed implementation of the method for heating a silane reactor using hot gas recycle with an ejector used to provide the recycle of the gas after gas cleaning via a cyclone. An example of silicon deposition using the design shown in FIG. 2 is as follows:

A 10 cm diameter quartz reactor was loaded with a 90 cm bed of 850 micron average diameter silicon beads. The reactor, effluent piping and cyclone are well insulated. The reactor was brought up to 750–800 C. using argon as a heating and fluidizing gas through stream 6 with a small purge stream flow through stream 1. A small cooling water flow, stream 9, of 25 ml/min was started to the silane inlet cooling device 8, to provide thermal isolation of the inlet from the reactor temperature. The inlet water temperature was 20 C. and the outlet temperature of stream 10 was 40 C. for a parasitic heat loss of 35 watts. A small flow, 1 SLM, of argon was started through stream 2 to the bead removal tube. A small flow of water, stream 10 of 100 ml/min was started to the bead cooler 12.

Then hydrogen was bled into all three gas streams, 1,2,6, to displace the argon, with the recycle temporarily closed. Once the reactor was at temperature and operating on hydrogen the recycle ejector was restarted using hydrogen, the temperature of stream 1 was set at 350 C. and silane was slowly introduced. Simultaneously the temperature of recycle stream 2 was increased to design conditions of 1100 C. At design conditions the silane was 80 SLM, the recycle hydrogen flow was 320 SLM and the ejector flow was 20 SLM. Bed temperature was 860 C. at the bottom, dropping to 850 C. at the top of the bed and 810 C. at the top of the reactor. Recycle gas from the cyclone was 600 C. and the motive gas for the ejector was at 25 C. and 100 psig. The hydrogen flow to the bead cooler was between 5–7 SLM.

The bed was observed to be slugging vigorously but pressure drop was stable during the run. Wall deposits were formed but could be etched off easily at the end of the run. After the run the mass balance showed the deposited silicon was about 5.5 Kg/hr which is 98% of the theoretical yield and no major agglomerates were seen at the end of the run. The power to the hydrogen heater was 5 kW on average.

To accomplish the important functions of the invention of increasing silicon production and energy efficiency, there is shown in FIG. 3a detailed implementation of using recycle gas heating and pulsed solids recycle using the silicon product. This is convenient in cooling the product and allowing the use of cooler recycle gas, which reduces handling, contamination, and materials of construction problems associated with high temperature. In this design multiple silane inlets (4) are used to provide improved distribution of the larger silane flow. This design requires more cooling water flow and thus higher heat losses but the heat supply is improved because of the use of the solid silicon product to carry heat into the reaction zone and heat is recovered from the product silicon in stream 3 as it goes down the bead and gas heater zone and contacts the incoming hydrogen in streams 6 and 2.

Figure 3:
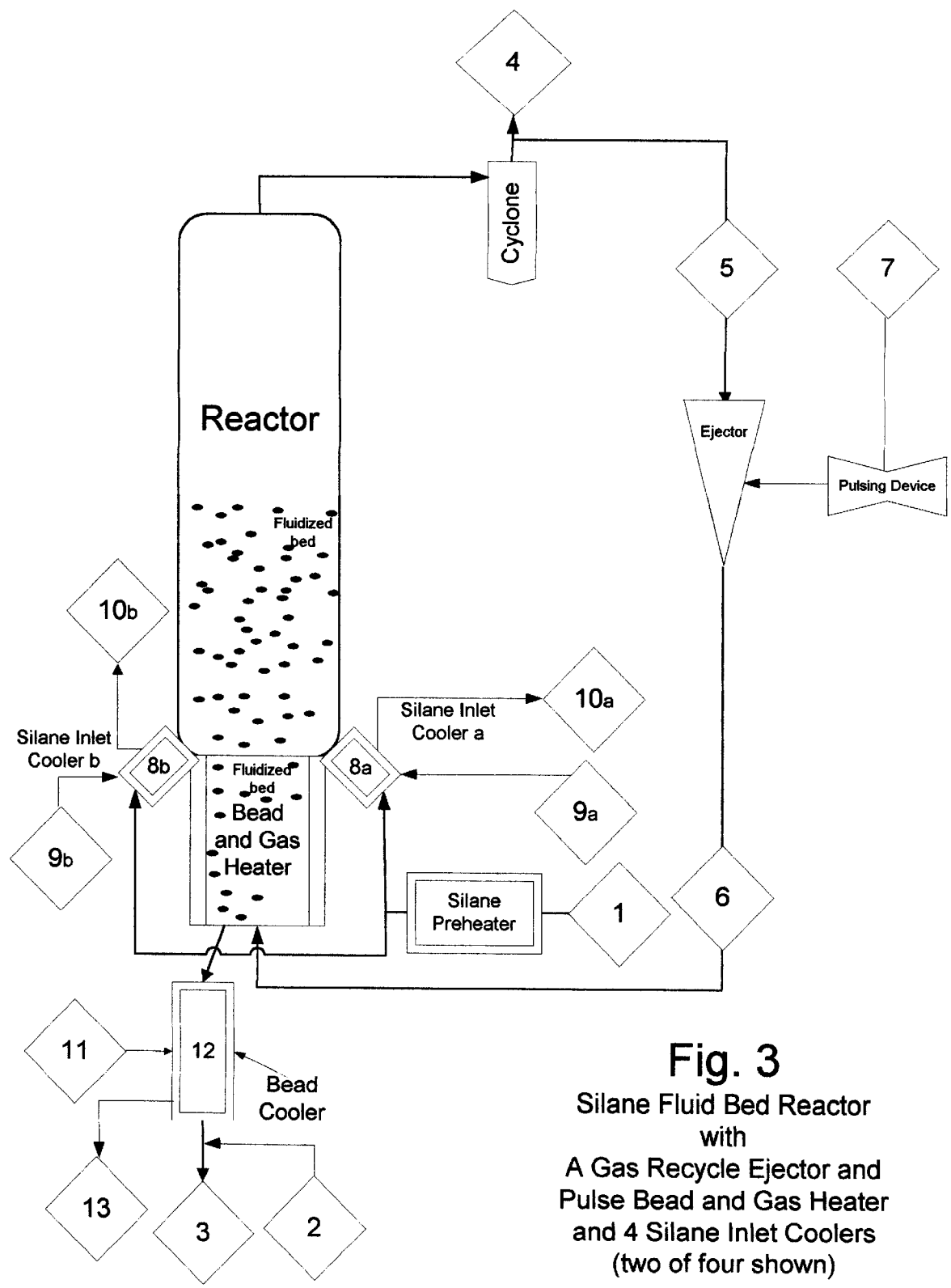
FIG. 3 shows a more detailed schematic and mass and energy balance of a preferred method to heat a silane fluid bed reactor using pulsing silicon bead recycle and hot hydrogen gas recycle together with heat recovery from product silicon and post deposition annealing.

An example of silicon deposition using the design shown in FIG. 3 is as follows:

A quartz reactor consisting of a bead and gas heater zone of 90 cm length and 5 cm in diameter and an insulated reaction zone of 900 cm length and 10 cm diameter was loaded with a 240 cm bed of 850 micron average diameter silicon beads. The four silane inlets for stream 1 were located 100 cm above the bottom of the reactor. The reactor, effluent piping and cyclone are well insulated. The reactor was brought up to 750–800 C. using argon as a heating and fluidizing gas through stream 2 with a small purge stream flow through stream 1. The pulsing of the argon flow on stream 2 was started at 1cycle per second. A small cooling water flow of 100 ml/min was started to the silane inlet cooling devices 8a, 8b, 8c and 8d (25 ml ea) to provide thermal isolation of the inlet from the reactor temperature. The inlet water temperature was 20 C. and the outlet temperature was 42 C. for a parasitic heat loss of 150 watts. A small flow, 1 SLM, of argon was started through stream 6 to the bead removal tube. A small flow of water (100 ml/min) was started to the bead cooler through stream 11.

Then hydrogen was bled into all three streams to displace the argon with the recycle temporarily closed. Once the reactor was at temperature and operating on hydrogen the recycle ejector was restarted using hydrogen, the temperature of stream 1 was set at 350 C. and silane was slowly introduced. Pulsing continued at 1 cycle per second. Simultaneously the temperature of the hydrogen/bead heater zone at the bottom of the reactor was increased to design conditions of 1100 C. for the wall temperature at the top. At stable operating conditions the silane flow, 1, was 200 SLM, the recycle hydrogen flow 6, varied between 75–300 SLM and the ejector flow was varied between 5–20 SLM to provide the pulsing. Bed temperature was 860 C. at the bottom, dropping to 840 C. at the top of the bed and 810 C. at the top of the reactor. Recycle gas from the cyclone was at 400 C. and the motive gas for the ejector was at 25 C. and 100 psig. The bed was observed to be slugging vigorously and some dust was carried over into the cyclone but pressure drop was stable during the run. Beads were removed 3, at 1 min intervals from the bottom of the heater at a rate of 13.5 Kg/hr. Bead exit temperature was 80 C. Wall deposits were formed but could be etched off easily at the end of the run. After the run the mass balance showed the deposited silicon was about 95% of the theoretical yield and no major agglomerates were seen at the end of the run. Power to the hydrogen/bead heater was 6 kW on average. The required cooling load per degree C for the product silicon 3, is very close to the heating load per degree C for the incoming hydrogen 6, hence this is a good opportunity for heat exchange.

Figure 4:
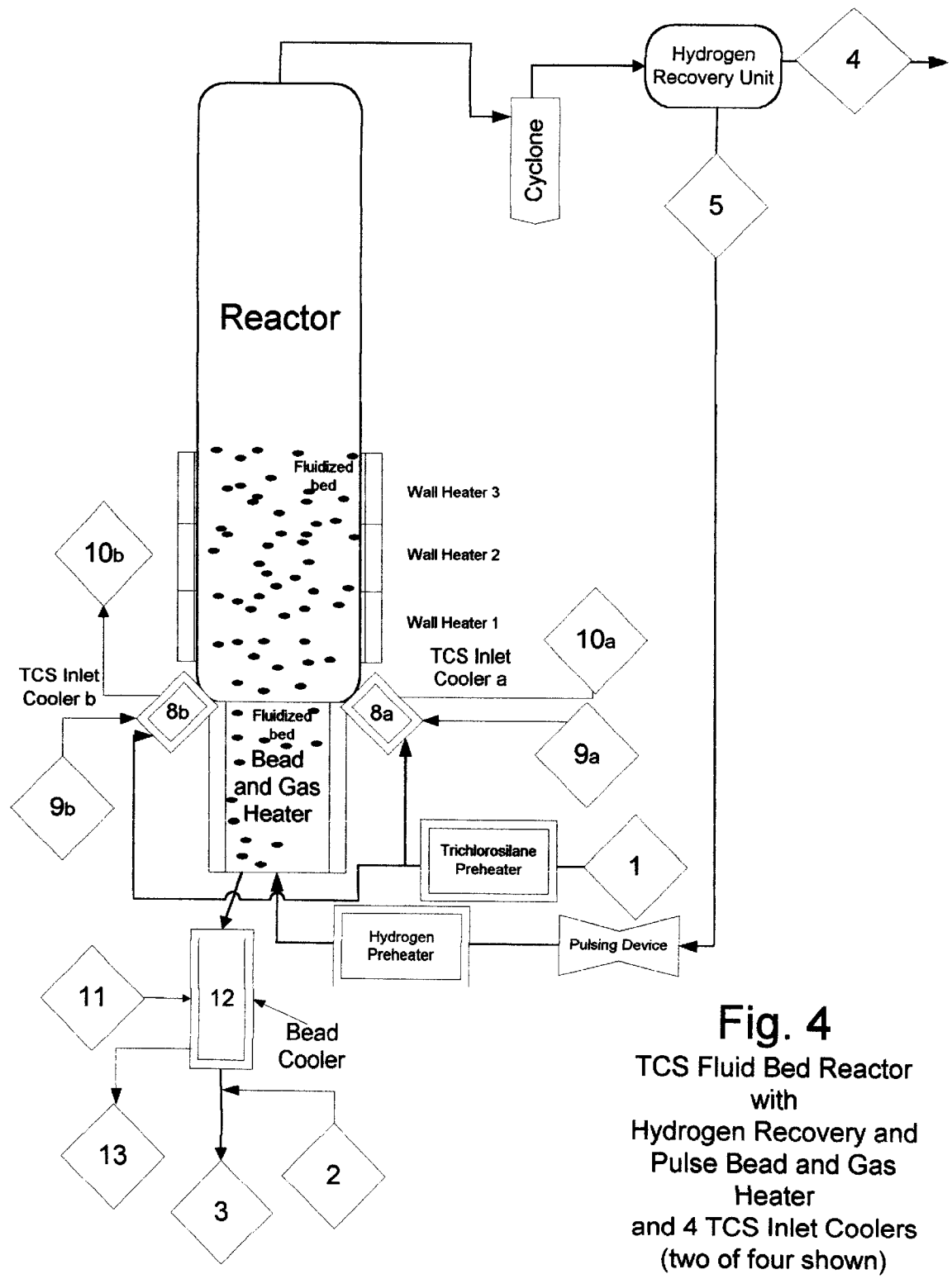
FIG. 4 shows a more detailed schematic and mass and energy balance of a preferred method to heat a trichlorosilane fluid bed reactor using pulsing silicon bead recycle and hydrogen gas recycle with optional wall heaters.

Finally in FIG. 4 the important function of increasing the yield of silicon from trichlorosilane is shown using recycle gas heating in conjunction with wall heating. In the trichlorosilane decomposition there are two main reactions; thermal decomposition to silicon and silicon tetrachloride and hydrogen reduction to silicon and hydrogen chloride. The second reaction produces more silicon per mole of trichlorosilane but requires dilution with hydrogen and higher temperatures. Since the reactions are equilibrium reactions the products of the reaction of the reaction inhibit the reaction so direct recycle of effluent is not advisable. Instead the residual hydrogen must be extracted from the effluent and recycled through an external hydrogen recovery system and some additional hydrogen is required.

An example of silicon deposition using the design shown in FIG. 4 is as follows:

A quartz reactor consisting of a bead and gas heating zone of 90 cm length and 5 cm in diameter and a heated reactor section of 270 cm in length and 10 cm in diameter followed by an insulated reactor section of 630 cm and 10 cm diameter was loaded with a 260 cm bed of 1000 micron average diameter silicon beads. The four trichlorosilane inlets for stream 1 were located 100 cm above the bottom of the reactor. The reactor, effluent piping and cyclone are well insulated. The reactor was brought up to 750–800 C. using the heaters above and below the trichlorosilane inlet and argon as a heating and fluidizing gas through stream 2 with a small purge stream flow through stream 1. The pulsing of the argon flow on stream 2 was started at 1 cycle per second. A small cooling water flow of 100 ml/min was started to the inlet cooling devices to provide thermal isolation of the inlet from the reactor temperature. The inlet water temperature was 20 C. and the outlet temperature was 42 C. for a parasitic heat loss of 150 watts. A small flow, 1 SLM, of argon was started through stream 6 to the bead removal tube. A small flow of water (100 ml/min) was started to the bead cooler through stream 11.

Then hydrogen was bled into all three streams to displace the argon. Once the reactor was at temperature and operating on hydrogen, the reactor heaters above the trichlorosilane inlet were reduced to 850 C. and the temperature of stream 1 was set at 350 C. and trichlorosilane was slowly introduced. Pulsing continued at 1 cycle per second. Simultaneously the temperature of the hydrogen/bead heater at the bottom of the reactor was increased to design conditions of 1100 C. for the wall temperature at the top. At stable operating conditions the trichlorosilane flow in stream 1 was 40 SLM and the temperature was 350 C., the main hydrogen flow in stream 2 was varied between 300 and 500 SLM and the hydrogen flow to the bead cooler was 5–7 SLM. Bed temperature was 860 C. at the trichlorosilane inlet, dropping to 850 C. at the top of the bed and 810 C. at the top of the reactor. The preheat temperature of the hydrogen to the bottom of the reactor was set at 500 C. The bed was observed to be slugging vigorously and some dust was carried over into the cyclone but pressure drop was stable during the run. Beads were removed at 5 min intervals from the bottom of the heater at a rate of 0.45 Kg/hr. Bead exit temperature was 35 C. with the bead cooling hydrogen inlet at 20 C.

Wall deposits were formed but could be etched off easily at the end of the run. After the run the mass balance showed the deposited silicon yield was 16% of the silicon in the TCS and was about 95% of the theoretical yield for these conditions and no major agglomerates were seen at the end of the run.

In a second run with the same reactor and under the same start up conditions but with a 360 cm bed, the reactor heaters above the trichlorosilane inlets were increased in temperature. Three heater zones were controlled at different wall temperature settings to spread out the heat load and the deposition in the reactor and on the reactor walls. The lowest heater was set at 950 C., the next at 1050 C. and the top at 1150 C. Power input was about 3 Kw per heater. The silicon production increased to 0.72 kg/hr which is 25.7% of the silicon in the TCS and is an improvement of over 50% in yield compared to the previous example. The increased electrical consumption per hour was 9 kWh at a value of $0.9 for a silicon production increase of 0.27 kg/h with a value of $13.50.

The new heating method of using the sensible heat of non decomposing gases or solids to maintain the reactor inlet temperature greater than 800 C. despite the low (350 C.) temperature of the decomposable silicon feedstock avoids many of the heating problems of other methods and offers virtually unlimited scale up. If a gas such as hydrogen provides the heating and the heater is separate from the reactor then it can be of any arbitrary size as is needed for heat transfer. It can even be a fired heater such as are used in refinery hydrogenation reactors. If it is desired to take advantage of the pulsing technique to heat the gas and move beads in and out of the reactor then the gas/bead heater will typically be heated through the wall but the heater may be extended in length as well as diameter thus simplifying scale up and of course a gas preheater may be used which can be any size. Other patents such as U.S. Pat. No. 5,374,413 use microwaves which are more expensive and difficult to implement because silicon wall deposits block microwaves. In U.S. Pat. No. 5,798,137 lasers are used for the critical heating in the initial entry or jet region and this is an even more expensive mechanism and much less efficient. of resistance heaters is much cheaper, more efficient and more reliable. Use of such heaters below the inlet of the decomposable gas allows high heat fluxes and wall temperatures without wall deposit problems. It is of course feasible to use microwaves in the same location because of the absence of wall deposits if desired and there may be some benefits.

It is also possible to combine this new heating technique with other techniques providing the requirements of the other heating techniques can be met as was shown in the example using trichlorosilane and wall heaters.

In summary the method provides a cheap, effective and flexible solution to the problem of heating fluidized bed silicon deposition reactors, which can be adapted to different deposition chemistries and conditions and easily scaled up. The heat losses caused by the thermal isolation of the inlet or inlets for the decomposable silicon feedstock are minor compared to other losses because the isolation is restricted to a small area in the immediate vicinity of the inlet or inlets.

In the present form of the invention the principle innovation of providing sensible heat into the entry zone by heating and injecting non-decomposable gases and/or solids into the entry zone near to the inlet of inlets of the decomposable silicon feedstock can be applied in many ways. A second innovation is localized thermal isolation of the inlet of the decomposable silicon feedstock to prevent wall deposits plugging the said inlet. This objective can be achieved in many ways including cooling the inlet gas or cooling the inlet area. Previous patents have attempted to cool the entire distribution means of the reactor, which has proven to have very high energy demand because of the combination of large area and high heat transfer rates. In this method the distribution means used to provide fluidization in the reactor is provided only for the non-decomposable gas and hence does not require cooling. The inlets for the decomposable gas are for the purpose of injecting the decomposable feedstock into the reactor and are few in number and small in size and hence can be cooled without a large heat penalty.

In the best embodiment of the system, an additional innovation of pulsing the inlet non-decomposable gas is used to cycle silicon product into and out of the entry zone and the silicon feedstock is heated close to its decomposition temperature and very localized cooling of the inlet prevents decomposition at the inlet wall. In the preferred embodiment for use of silane a portion of the hydrogen produced from the reaction is recycled directly back to the reactor at an elevated temperature and used to partially cool the silicon product. In the preferred embodiment for trichlorosilane, tribromosilane and other halogen containing feedstocks, the hydrogen is recycled back to the reactor through a purification system and a portion used to cool the product, the pulse heating system is used below the trichlorosilane inlets and wall heaters are used above it to increase the silicon yield and distribute the silicon deposition by means of a temperature profile.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for heating a fluidized bed silicon deposition apparatus comprising:
   providing a plurality of silicon beads into a reactor having a chamber that is sized and shaped to contain the beads in a fluidized bed and defines one or more fluidizing inlets suitable for injection of a first gas which can be heated without decomposing to form silicon separately from one or more fluidizing inlets suitable for injection of a second gas which decomposes to form silicon when heated;
   providing into the reactor a source of the first gas at temperatures between 600–1600° C., the source of the first gas being operable to maintain the beads in a fluidized state when mixed in the reactor with the second gas;
   providing into the reactor a source of the second gas at a temperature less than 400° C., wherein the second gas decomposes to form silicon;
   wherein the reactor has means to remove some of the beads, heat the removed beads to a temperature between 800–1200° C. and then return the heated beads to the reactor.

2. The method of claim 1 where the fluidizing inlets suitable for the injection of a second gas are provided with:
   source of cooling fluid
   a cooling means to prevent heat transmitted from the reactor from raising the temperature of the inlets above 400° C.

3. The method of claim 1, where the sources of the first and second are common elements.

4. The method of claim 1 where all or some of the source of the first gas is recycled from the effluent of the reactor.

5. The method of claim 1 where the beads are removed from or near the fluidized bed of beads in the reactor and returned to or near the bottom of the reactor.

6. The method of claim 1 where the beads are removed from or near the bottom of the reactor by gravity, heated in a combined first gas and bead heater which provided with one or more fluidizing inlets suitable for injection of the first gas and returned to or near the bottom of the reactor by pulsing some or all of a source of first gas being operable to supply a cyclically fluctuating gas flow, the peak floe of said gas being sufficient to push up the beads into the vessel and the low flow being insufficient to prevent the beads being drawn down into the heater.

7. The method of claim 1 or 6 where 0–50% of the heated beads are removed as product beads instead of being returned to the reactor.

8. The method of claim 7 where the product beads are directly contacted with the incoming first gas to cool the beads and heat the incoming first gas.

9. The method of claim 1 where the beads are removed from or near the the reactor, heated, and returned to or near the top of the fluidized bed of silicon beads in the reactor.

10. The method of claim 1 where the first gas is a gas that can be heated without decomposition during heating to temperatures between 600–1600 degrees Celsius and can be injected into the reactor without causing contamination of the silicon beads produced in the reactor and is selected from the group consisting of, hydrogen, helium argon, silicon tetrachloride, silicon tetrabromide and silicon tetraiodide and the second gas is a gas which decomposes when heated to form silicon and is selected from the group consisting of trichlorosilane, dichlorosilane, monochlorosilane, monosilane, disilane, trisilane, tribromosilane, dibromosilane and monobromosilane, triiodosilane, diiodosilane and monoiodosilane.

* * * * *